US010103645B2

(12) United States Patent
Akagi et al.

(10) Patent No.: US 10,103,645 B2
(45) Date of Patent: Oct. 16, 2018

(54) POWER CONVERTER

(71) Applicant: TOKYO INSTITUTE OF TECHNOLOGY, Tokyo (JP)

(72) Inventors: Hirofumi Akagi, Tokyo (JP); Makoto Hagiwara, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 75 days.

(21) Appl. No.: 15/126,356

(22) PCT Filed: Mar. 17, 2015

(86) PCT No.: PCT/JP2015/057907
§ 371 (c)(1),
(2) Date: Sep. 15, 2016

(87) PCT Pub. No.: WO2015/141680
PCT Pub. Date: Sep. 24, 2015

(65) Prior Publication Data
US 2017/0085193 A1    Mar. 23, 2017

(30) Foreign Application Priority Data

Mar. 19, 2014 (JP) ................................ 2014-055793

(51) Int. Cl.
*H02M 7/537* (2006.01)
*H02M 5/293* (2006.01)
(Continued)

(52) U.S. Cl.
CPC .............. *H02M 7/537* (2013.01); *H02J 3/18* (2013.01); *H02M 1/42* (2013.01); *H02M 5/293* (2013.01);
(Continued)

(58) Field of Classification Search
CPC .... H02M 5/4585; H02M 5/458; H02M 5/447; H02M 5/45; H02M 5/4505; H02M 5/005;
(Continued)

(56) References Cited

U.S. PATENT DOCUMENTS

2012/0026767 A1*  2/2012  Inoue ............... H02M 7/217
                                                363/89
2012/0126628 A1*  5/2012  Bjerknes ............. F03D 7/0224
                                                307/84
(Continued)

FOREIGN PATENT DOCUMENTS

EP    2485384 A1    8/2012
EP    2541752 A1    1/2013
(Continued)

OTHER PUBLICATIONS

Akagi et al., "Classification and Terminology of Modular Multilevel Cascade Converters (MMCC)," Annual Meeting of the Institute of Electrical Engineers of Japan, Mar. 2010, No. 4-043, pp. 71-72 (in Japanese).
(Continued)

*Primary Examiner* — Jue Zhang
*Assistant Examiner* — Kevin H Sprenger
(74) *Attorney, Agent, or Firm* — Kilpatrick Townsend & Stockton LLP (57) ABSTRACT

This power converter is provided with: three clusters (CLu, CLv, CLw) in which unit cells are cascade-connected; and power supplies of the same kind which are respectively connected to one end of each of the three clusters. Terminals of the three clusters at the side not connected to the power supplies are respectively connected to other ends of the power supplies connected to the other clusters to form a delta-connection configuration. Three connections of the delta-connection configuration are respectively connected to each of the U, V, and W phases of a three-phase alternating current, and power conversion between the power supplies and the three-phase AC is enabled. If DC power supplies (Vdcu, Vdcv, Vdcw) are employed as the power supplies, power conversion between the DC power supplies and the three-phase AC power supplies can be performed. If in-phase single-phase AC power supplies are employed as the
(Continued)

power supplies, power conversion between either the single-phase AC power supplies and the three-phase AC power supplies, or the three-phase AC power supplies can be performed.

14 Claims, 10 Drawing Sheets

(51) Int. Cl.
*H02J 3/18* (2006.01)
*H02M 1/42* (2007.01)
*H02M 5/10* (2006.01)
*H02M 7/483* (2007.01)

(52) U.S. Cl.
CPC ...... *H02M 5/10* (2013.01); *H02M 2007/4835* (2013.01); *Y02E 40/30* (2013.01)

(58) Field of Classification Search
CPC ... H02M 7/7575; H02M 7/537; Y02B 70/126; H02J 9/062; H02J 3/36
USPC ...................................... 363/34–37
See application file for complete search history.

(56) References Cited

U.S. PATENT DOCUMENTS

| | | | |
|---|---|---|---|
| 2015/0029764 A1* | 1/2015 | Peng | H02M 7/49 363/37 |
| 2015/0295507 A1* | 10/2015 | Barupati | H02M 7/487 363/35 |
| 2016/0211763 A1* | 7/2016 | Wang | H02M 5/4585 |
| 2017/0077746 A1* | 3/2017 | Kanakasabai | H02J 9/061 |

FOREIGN PATENT DOCUMENTS

| | | |
|---|---|---|
| EP | 2667279 A1 | 11/2013 |
| JP | 2011-045210 A | 3/2011 |
| JP | 2011-176955 A | 9/2011 |
| WO | 2014/030202 A1 | 2/2014 |

OTHER PUBLICATIONS

Akagi et al., "Classification, Terminology and Application of the Modular Multilevel Cascade Converter (MMCC)," IEEE Transactions on Power Electronics, Nov. 2011, vol. 26, No. 11, pp. 3119-3130.

Hagiwara et al., "PWM Control and Experiment of Modular Multilevel Converters (MMC)," The transactions of the Institute of Electrical Engineers of Japan. D, Jul. 2008, vol. 128, No. 7, pp. 957-965 (in Japanese).

Hagiwara et al., "Control and Experiment of Pulsewidth-Modulated Modular Multilevel Converters," IEEE Transactions on Power Electronics, Jul. 2009, vol. 24, No. 7, pp. 1737-1746.

Hagiwara et al., "Application of a Modular Multilevel Cascade Converter (MMCC-SDBC) to a STATCOM: Control of Active Power and Negative-Sequence Reactive Power," The transactions of the Institute of Electrical Engineers of Japan. D, Dec. 2011, vol. 131, No. 12, pp. 1433-1441 (in Japanese).

Hagiwara et al., "Negative-Sequence Reactive Power Control by a PWM STATCOM Based on a Modular Multilevel Cascade Converter (MMCC-SDBC)," IEEE Transactions on Industry Applications, Mar./Apr. 2012, vol. 48, No. 2, pp. 720-729.

Akagi et al., "Classification and Terminology of the Modular Multilevel Cascade Converters (MMCC)" National Convention Record I.E.E. Japan, 2010, No. 4-043, pp. 71-72.

International Application No. PCT/JP2015/057907, International Search Report dated Jun. 16, 2016, 2 pages.

\* cited by examiner

POWER CONVERTER

CROSS-REFERENCE TO RELATED APPLICATIONS

This application is a 371 National Phase Application of PCT/JP2015/057907, filed Mar. 17, 2015, which application claims priority to Japanese Application no. 2014-055793, filed Mar. 19, 2014, the disclosures all of which are incorporated herein by reference.

TECHNICAL FIELD

The present invention relates to a power converter, and particularly, relates to a modular multilevel cascade-type power converter.

BACKGROUND ART

There has recently been a modular multilevel cascade converter (MMCC) as a next generation transformer-less power converter that is suitable for high-voltage and large-capacity application. The MMCC is characterized in that a "cluster" (also called as an arm or a leg in some cases) configuring the converter is formed by cascade connection of unit cells. The representative unit cells include a chopper cell CC illustrated in FIG. 1A and a bridge cell BC illustrated in FIG. 1B.

Figure 1A:
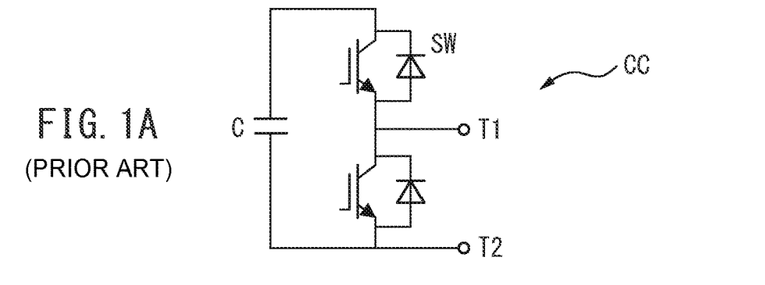
FIG. 1A is a circuit diagram illustrating the configuration of a chopper cell.

The chopper cell CC illustrated in FIG. 1A can be regarded as a part of a bidirectional chopper, and includes two semiconductor switches SW that are connected in series, a direct current (DC) capacitor C that is connected in parallel with the two semiconductor switches SW, and input and output terminals T1 and T2 of a current that is discharged from the DC capacitor C or charged in the DC capacitor C according to switching operation of the semiconductor switches SW. The semiconductor switch SW in this example is configured by an IGBT. FIG. 1C illustrates a cluster CL in which a plurality of the chopper cells CC illustrated in FIG. 1A are cascade-connected.

Figure 1B:
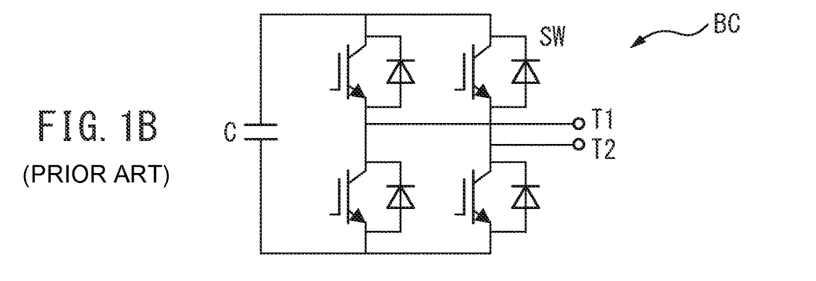
FIG. 1B is a circuit diagram illustrating the configuration of a bridge cell.
Figure 1C:
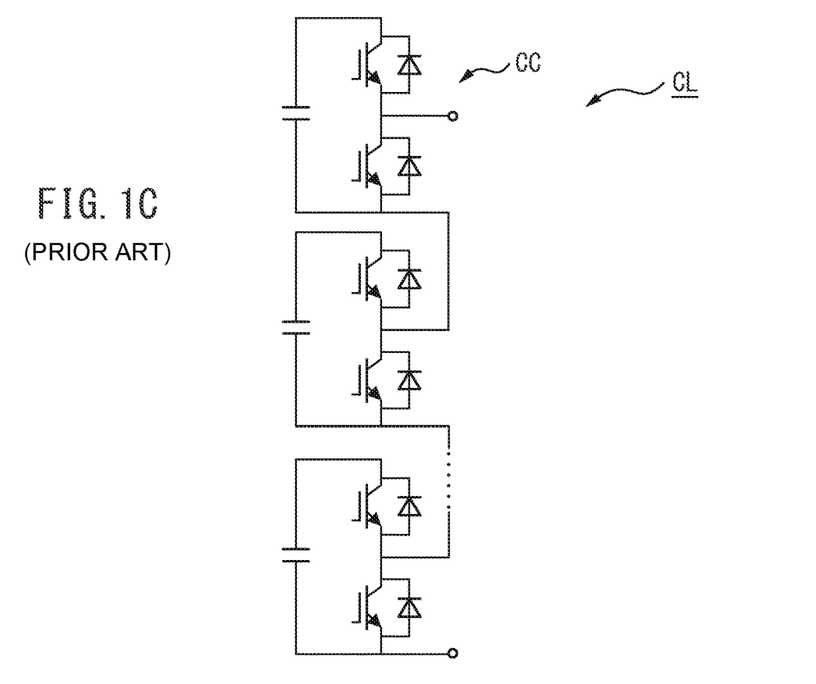
FIG. 1C is a circuit diagram illustrating an example of a cluster formed by cascade-connecting a plurality of chopper cells.

The bridge cell BC illustrated in FIG. 1B is equivalent to a single-phase full-bridge converter, and includes parallelly connected two pairs of two semiconductor switches SW that are connected in series, a DC capacitor C that is connected in parallel with the two pairs of semiconductor switches SW, a series connection point for each pair of the two semiconductor switches SW, and input and output terminals T1 and T2 of a current that is discharged from the DC capacitor C or charged in the DC capacitor C.

The MMCC can be roughly classified into the star-connected MMCC and the delta-connected MMCC according to the connection method. The following six types of the star-connected MMCC and the delta-connected MMCC have been known hitherto, four types of the star-connected MMCC and the delta-connected MMCC of which are disclosed in Non Patent Literature 1.
 1. Single star-connected bridge cell MMCC (SSBC)
 2. Double star-connected bridge cell MMCC (DSBC)
 3. Double star-connected chopper cell MMCC (DSCC)
 4. Triple star-connected bridge cell MMCC (TSBC)
 5. Single delta-connected bridge cell MMCC (SDBC)
 6. Double delta-connected bridge cell MMCC (DDBC)

The applications of the star-connected MMCCs are described herein. The SSBC is applicable to a static synchronous compensator (STATCOM) and a battery power storage device. The DSBC and the DSCC can connect a DC power supply between neutral points of their star connections, and thus can realize DC to three-phase alternating current (AC) power conversion. When the DSBC is used, it is possible to replace the DC power supply with a single-phase AC power supply and is possible to realize single-phase AC to three-phase AC power conversion. The TSBC can connect a three-phase power supply (or a three-phase load) between neutral points of its star connections, and thus can realize three-phase AC to three-phase AC power conversion. Since the star-connected MMCCs are irrelevant to the present invention, further description therefor is omitted.

Figure 2A:
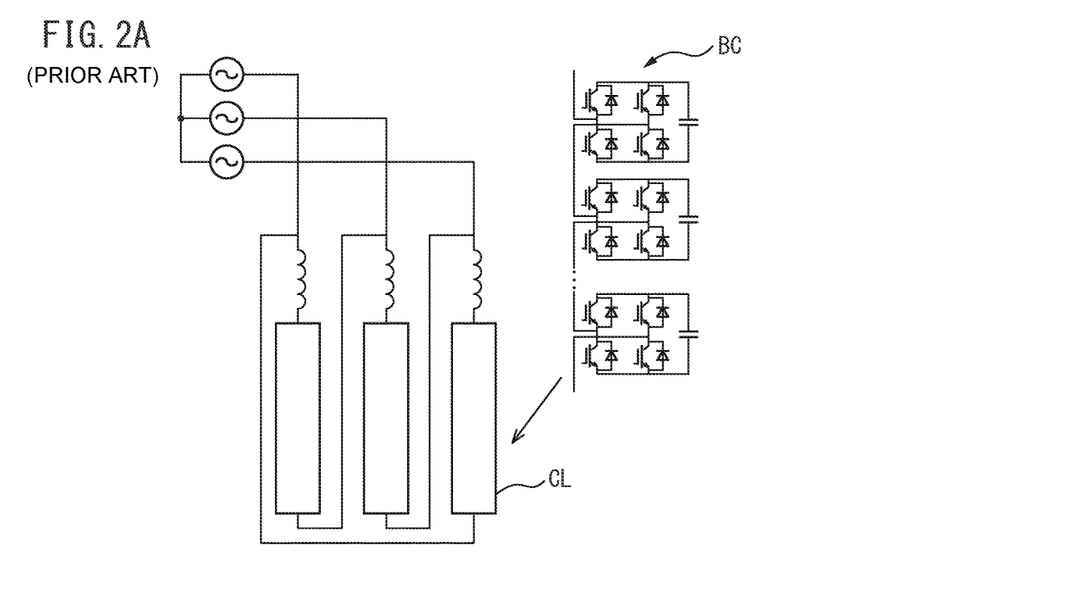
FIG. 2A is a circuit diagram illustrating the configuration of an existing single delta-connected bridge cell MMCC (SDBC).
Figure 3:
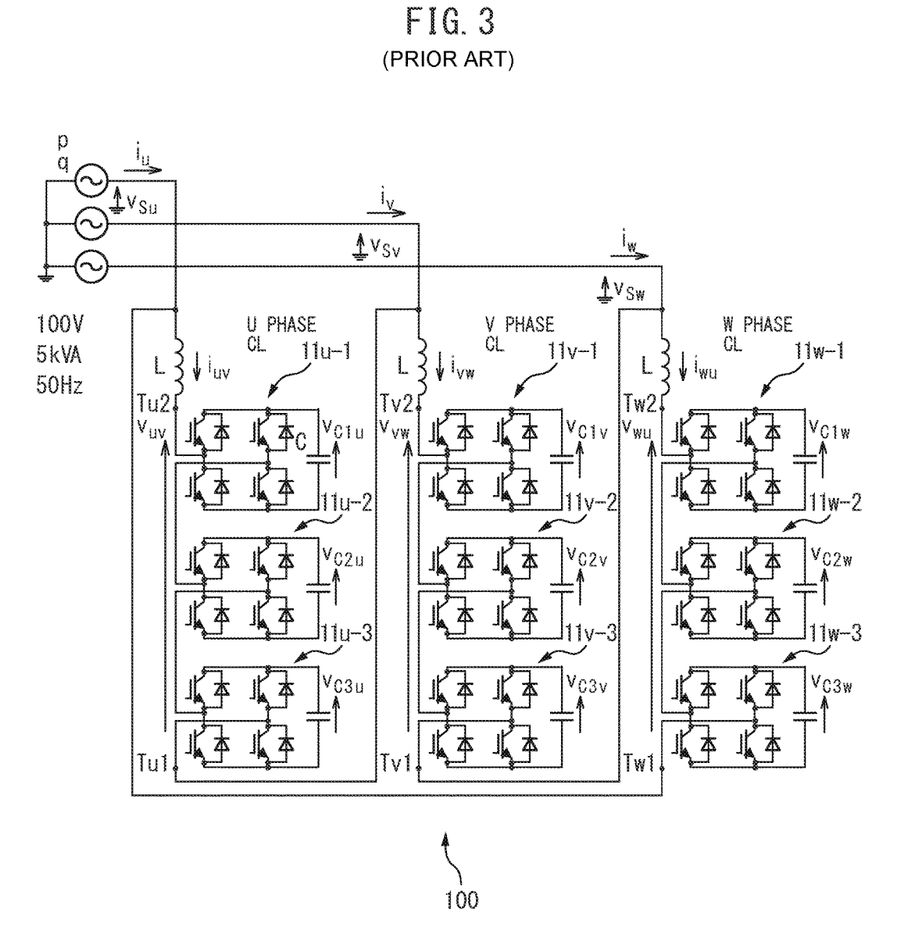
FIG. 3 is a circuit diagram illustrating the detail of a circuit in each of the clusters of the SDBC illustrated in FIG. 2A.

Next, the applications of the delta-connected MMCCs are described. As illustrated in FIG. 2A, the SDBC includes delta-connected three clusters CL in each of which a plurality of bridge cells BC are cascade-connected, with the three connection points of the delta connection being connected to the respective phases of the three-phase AC power supplies. In addition, FIG. 3 illustrates the detail of a circuit configuration in each of the clusters of the SDBC illustrated in FIG. 2A. Since the SDBC can control negative-sequence reactive power by controlling a circulating current in the delta connection, it is expected to be applied to a negative-sequence reactive power compensation apparatus for an electric arc furnace.

In a single delta-connected bridge cell MMCC 100 (hereinafter, referred to as a power converter 100) illustrated in FIG. 3, the phase voltages of the respective phases of the system-side power voltage are defined as $v_{Su}$, $v_{Sv}$, and $v_{Sw}$, and the currents of the respective phases (hereinafter, referred to as "power currents".) are defined as $i_u$, $i_v$, and $i_w$. In addition, the currents that flow into the clusters CL of the respective phases from the delta connection portions of the power converter 100 (hereinafter, referred to as "converter currents") are defined as $i_{uv}$, $i_{vw}$, and $i_{wu}$. In addition, the output voltages of the clusters CL of the respective phases from the delta connection portions of the power converter 100, i.e., the line voltages between output terminals $T_U1$-$T_U2$, $T_V1$-$T_V2$, and $T_W1$-$T_W2$ of the power converter 100 are defined as $v_{uv}$, $v_{vw}$, and $v_{wu}$. In addition, the voltages of the DC capacitors in the bridge cells 11u-j, 11v-j, and 11w-j are defined as $v_{Cju}$ $v_{Cjv}$, and $v_{Cjw}$ (where j=1 to 3).

Figure 2B:
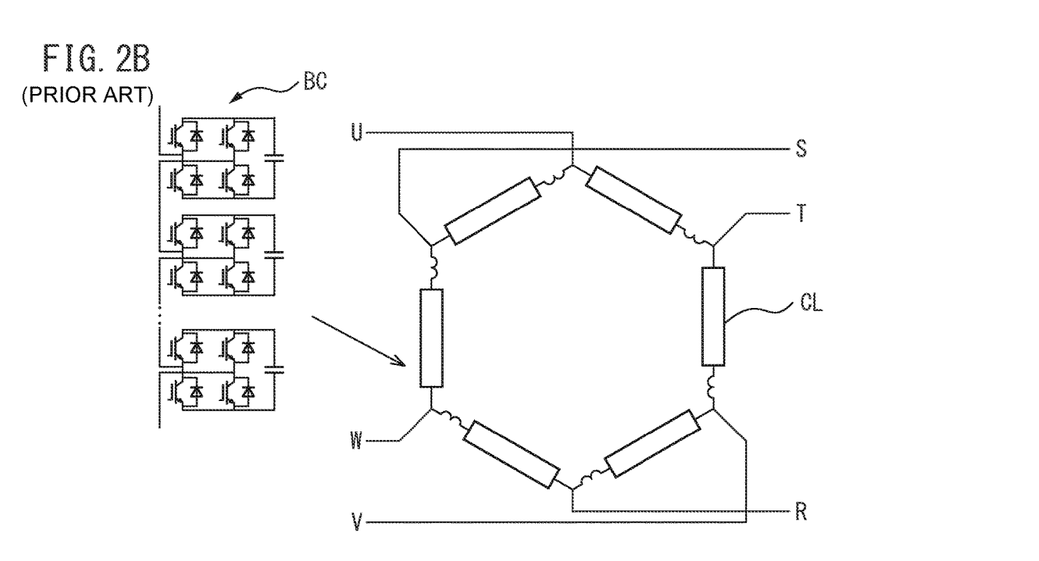
FIG. 2B is a circuit diagram illustrating the configuration of an existing double delta-Connected bridge cell MMCC (DDBC).

On the other hand, as illustrated in FIG. 2B, the DDBC includes six clusters CL in each of which a plurality of bridge cells BC are cascade-connected. In the double delta connection, pairs of two clusters CL that are connected in series are delta-connected, and the three connection points of the delta-connected pairs are respectively connected to the U phase, the V phase, and the W phase of the three-phase AC power supplies. The intermediate points of the serially connected clusters CL are respectively extracted as the R phase, the S phase, and the T phase. Thus, the DDBC is capable of realizing three-phase AC to three-phase AC power conversion in the same way as the TSBC.

CITATION LIST

Non Patent Literature

[Non Patent Literature] AKAGI Hirofumi, HAGIWARA Makoto (March 2010). 'Classification and Terminology of the Modular Multilevel Cascade Converter (MMCC)' Annual Meeting of The Institute of Electrical Engineers of Japan, no. 4-043, pp. 71-72, (in Japanese)

SUMMARY OF INVENTION

Technical Problem

However, there is a problem in that the existing delta-connected MMCCs cannot realize DC to three-phase AC power conversion and single-phase AC to three-phase AC power conversion, which are realizable in the star-connected MMCCs. As a result, the application fields of the existing delta-connected MMCCs have been limited in comparison with the existing star-connected MMCCs.

Therefore, in light of the above-described problem, the objective of the present invention is to provide a modular multilevel cascade-type power converter that can expand the application fields by realizing DC to three-phase AC power conversion and single-phase AC to three-phase AC power conversion in the existing delta-connected MMCCs.

Solution to Problem

A first embodiment of a power converter according to the present invention that realizes the above-described objective includes three clusters in which unit cells are cascade-connected, and power supplies of the same kind respectively connected to one end of each of the three clusters, wherein a delta connection is formed by connecting terminals of the three clusters at a side not connected to the power supplies to other ends of the power supplies that are connected to the other clusters, and three connection portions of the delta connection are connected to respective phases of a three-phase AC and power conversion is performed between the power supplies and the three-phase AC.

When DC power supplies are employed as the power supplies, the unit cells can be chopper cells that include two semiconductor switches that are connected in series and a DC capacitor that is connected in parallel therewith, or bridge cells that include parallelly connected two pairs of two semiconductor switches that are connected in series and a DC capacitor that is connected in parallel therewith. In addition, when in-phase AC power supplies are employed as the power supplies, the unit cells can be bridge cells.

A second embodiment of a power converter according to the present invention that realizes the above-described objective is a power converter which includes three clusters in which unit cells are cascade-connected, and DC power supplies that are inserted between arbitrary connection points of the plurality of unit cells in the three clusters, wherein a delta connection is formed by connecting anode-side terminals of the three clusters that include the DC power supplies to cathode-side terminals of the clusters that include the other DC power supplies, and three connection portions of the delta connection are connected to respective phases of a three-phase AC and power conversion is performed between the DC power supplies and the three-phase AC.

A third embodiment of a power converter according to the present invention that realizes the above-described objective is a power converter which includes three clusters in which unit cells are cascade-connected, and in-phase AC power supplies that are inserted between arbitrary connection points of the plurality of unit cells in the three clusters, wherein a delta connection is formed by connecting anode-side terminals of the three clusters that include the AC power supplies to cathode-side terminals of the clusters that include the other AC power supplies, and three connection portions of the delta connection are connected to respective phases of a three-phase AC and power conversion is performed between the AC power supplies and the three-phase AC.

When DC power supplies are inserted between arbitrary connection points of the plurality of unit cells, the unit cells may be chopper cells or bridge cells. In addition, when in-phase AC power supplies are inserted between arbitrary connection points of the plurality of unit cells, the unit cells may be bridge cells.

Advantageous Effects of Invention

According to the present invention, DC to three-phase AC power conversion can be realized by incorporating DC power supplies into respective sides of delta connection in the existing single delta-connected bridge cell MMCC. In addition, single-phase AC to three-phase AC power conversion can be realized by incorporating in-phase AC power supplies into respective sides that are delta-connected in the existing single delta-connected bridge cell MMCC. Further, DC to three-phase AC power conversion can be realized by replacing bridge cells in the existing single delta-connected bridge cell MMCC with chopper cells and incorporating DC power supplies into respective sides that are delta-connected. These configurations have an advantageous effect of enabling expansion of the application fields of the MMCCs.

DESCRIPTION OF EMBODIMENTS

An embodiment of the present invention is described based on some examples described below. Note that the same components as the components in the circuit of the existing SDBC described in FIG. 3 will be described assigning the same reference numerals as in FIG. 3.

Figure 4:
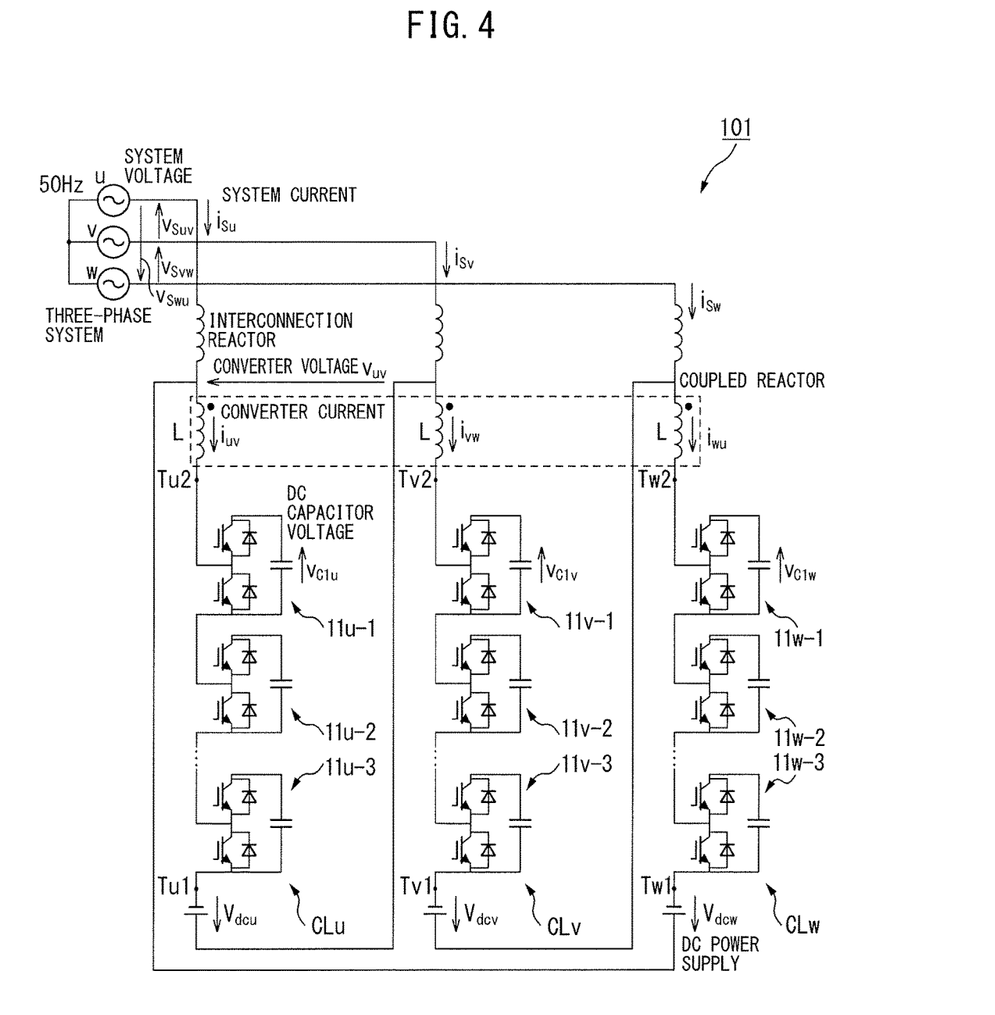
FIG. 4 is a circuit diagram illustrating a power converter according to a first example of the present invention.

FIG. 4 is a circuit diagram illustrating the configuration of a power converter 101 according to a first example of the present invention. In the existing power converter 100 illustrated in FIG. 3, bridge cells are used as unit cells in delta-connected three clusters CL. However, in the power converter 101 according to the first example, chopper cells are used as unit cell in delta-connected three clusters CL. In other words, a plurality of chopper cells which are cascade-connected are provided in each of clusters CLu, CLv, and CLw of the respective phases.

In the power converter 101 according to the first example illustrated in FIG. 4, three chopper cells 11u-j, 11v-j, and 11w-j (where j=1 to 3) that are cascade-connected as unit cells are provided in the clusters CLu, CLv, and CLw of the respective phases. Hereinafter, the examples of the present invention are described on the premise that the number of unit cells in each of the clusters is three. However, the number of unit cells in each of the clusters is not intended to limit the present invention. Note that a coupled reactor of each of the clusters of the power converter 101 in FIG. 4 is denoted by L, and a black dot (•) indicates the polarity of the coupled reactor L.

The structure of each of the chopper cells 11u-j, 11v-j, and 11w-j (where j=1 to 3) is as described in FIG. 1A. In FIG. 4, the system voltages of the respective phases of the three-phase-system-side power voltage are defined as $v_{Suv}$, $v_{Svw}$, and $v_{Swu}$ and the system currents are defined as $i_{Su}$, $i_{Sv}$, and $i_{Sw}$. In addition, the converter currents that flow into the clusters CLu, CLv, and CLw of the respective phases of the power converter 101 are defined as $i_{uv}$, $i_{vw}$, and $i_{wu}$. In addition, the voltages of the DC capacitors in the respective bridge cells 11u-j, 11v-j, and 11w-j are defined as $v_{Cju}$, $v_{Cjv}$ and $v_{Cjw}$ (where j=1 to 3).

The coupled reactors L in FIG. 4 include three windings and the winding numbers are equal respectively. The coupled reactors L include impedance only for the circulating current included in the converter currents $i_{uv}$, $i_{vw}$, and $i_{wu}$ that flow through the respective clusters CLu, CLv, and CLw, and the impedance for the system current component (50 Hz) is zero. The circulating current $i_z$ is defined as the following formula.

$$i_z = (i_{UV} + i_{VW} + i_{WU}) \div 3$$

In the power converter 101 according to the first example, an anode of a DC power supply Vdcu is connected in series with a terminal Tu1 on the opposite side of a terminal Tu2 at the coupled reactor L side of the cluster CLu of the U phase, and a cathode of the DC power supply Vdcu is connected to the delta connection portion of the cluster CLv of the V phase that connects to the V phase of the three-phase AC. In addition, an anode of a DC power supply Vdcv is connected in series with a terminal Tv1 on the opposite side of a terminal Tv2 at the coupled reactor L side of the cluster CLv of the V phase, and a cathode of the DC power supply Vdcv is connected to the delta connection portion of the cluster CLw of the W phase that connects to the W phase of the three-phase AC. Likewise, an anode of a DC power supply Vdcw is connected in series with a terminal Tw1 on the opposite side of a terminal Tw2 at the coupled reactor L side of the cluster CLw of the W phase, and a cathode of the DC power supply Vdcw is connected to the delta connection portion of the cluster CLu of the U phase that connects to the U phase of the three-phase AC.

This configuration of the power converter 101 according to the first example enables stationary transferring of power between the DC power supplies and the three-phase system, thereby realizing DC to three-phase AC power conversion. Note that this configuration needs to connect DC power supplies to the respective clusters, and thus the number of needed DC power supplies is three.

Figure 5A:
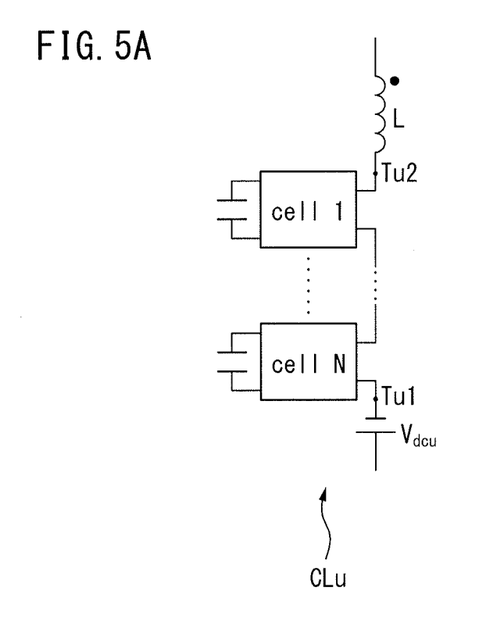
FIG. 5A is a circuit diagram indicating positions of unit cells, a reactor, and a DC power supply in each of the clusters in the circuit diagram illustrated in FIG. 4, the circuit diagram illustrating an example in which a reactor and a DC power supply are arranged at both ends of a plurality of cascade-connected unit cells.
Figure 5B:
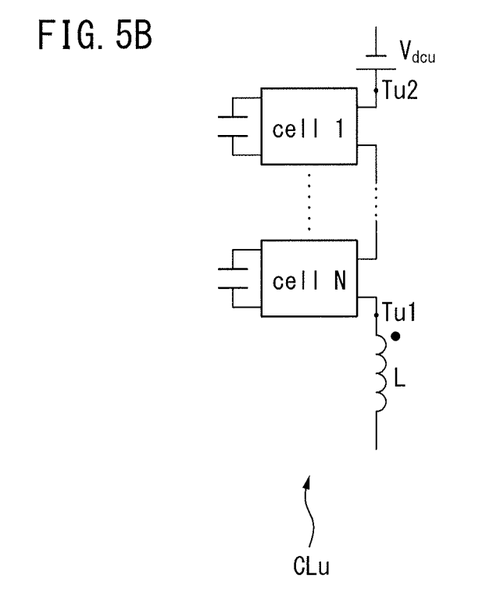
FIG. 5B is a circuit diagram indicating position of unit cells, a reactor, and a DC power supply in each of the clusters in the circuit diagram illustrated in FIG. 4, the circuit diagram illustrating an example in which a reactor and a DC power supply are arranged in reverse from the position in the circuit illustrated in FIG. 5A.

Note that the power converter 101 according to the first example illustrated in FIG. 4 includes the DC power supplies Vdcu, Vdcv, and Vdcw connected to outside the terminals Tu1, Tv1, and Tw1 of the clusters CLu, CLv, and CLw of the respective phases. Such a structure of the cluster CLu is alone illustrated in FIG. 5A. In the structure illustrated in FIG. 5A, the coupled reactor L is connected to the terminal Tu2 of the cluster CLu, and the DC power supply Vdcu is connected to the terminal Tu1. However, the coupled reactor L and the DC power supply Vdcu may be connected to the terminals Tu1 and Tu2 of the cluster CLu in reverse, as illustrated in FIG. 5B. The same applies to the V phase and the W phase.

Figure 5C:
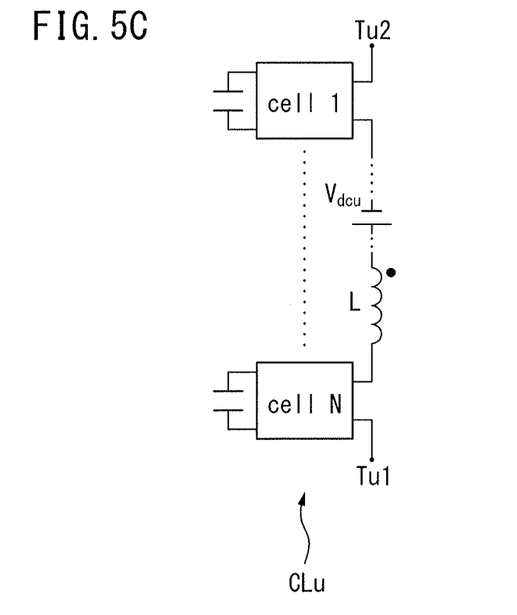
FIG. 5C is a circuit diagram indicating position of unit cells, a reactor, and a DC power supply in each of the clusters in the circuit diagram illustrated in FIG. 4, the circuit diagram illustrating an example in which a reactor and a DC power supply are arranged between any of unit cells out of a plurality of cascade-connected unit cells.

In addition, the coupled reactor L and the DC power supply Vdcu can be inserted into arbitrary positions between the chopper cells in the cluster CLu, as illustrated in FIG. 5C. The same applies to the V phase and the W phase.

The coupled reactors L can be replaced with three uncoupled reactors. In the same way as the coupled reactors L, the uncoupled reactors can be inserted into arbitrary portions in the clusters. When the uncoupled reactors are used, which also serve as interconnection reactors, interconnection reactors illustrated in FIG. 4 can be eliminated.

In order to normally operate the power converter 101 according to the first example illustrated in FIG. 4, it is needed that the voltages of the DC capacitors of the respective chopper cells are controlled to be constant. Four types of DC voltage controls, i.e., averaging control, inter-phase balance control, circulating current control, and individual balance control, are used in combination. The averaging control is for controlling arithmetic average voltages of all the DC capacitors. The inter-phase balance control is for controlling power being transferred between the clusters. The circulating current control is for controlling a current circulating in the delta connection. The individual balance control is for balancing individual voltages of the DC capacitors of the respective chopper cells. These control methods are described in the following literatures in detail. Since the control methods are not directly relevant to the configuration of the power converter of the present invention, further description therefor is omitted.

HAGIWARA Makoto, AKAGI Hirofumi (July 2008). 'PWM Control and Experiment of Modular Multilevel Converters (MMC)' The transactions of the Institute of Electrical Engineers of Japan. D, 128(7), pp. 957-965 (in Japanese)

HAGIWARA Makoto, MAEDA Ryo, AKAGI Hirofumi (December 2011). 'Application of a Modular Multilevel Cascade Converter (MMCC-SDBC) to a STATCOM: Control of Active Power and Negative-Sequence Reactive Power' The transactions of the Institute of Electrical Engineers of Japan. D, 131(12), pp. 1433-1441 (in Japanese)

Next, a result of an experiment using the power converter 101 according to the first example of the present invention is described. Table 1 denotes circuit constants used in the experiment. A model of 200 V and 6 kW is used in the experiment. In this regard, the number of chopper cells inserted into a cluster of each of the phases is eight rather than three. When configuring a cluster of each of the phases with eight chopper cells in this manner, the sum total of the cells used is twenty four. DC voltages Vdcu, Vduv, and Vdcw of 320 V are inserted in series with the respective clusters.

TABLE 1

Circuit constants used in Experiment

| Rated power | | 6 kW |
|---|---|---|
| Rated line voltage effective value | $V_S$ | 200 V |
| Rated current effective value | $I_S$ | 17 A |
| Rated frequency | $f_S$ | 50 Hz |
| Number of chopper cells for each phase | N | 8 |
| DC link voltage | $V_{dc}$ | 320 V |
| DC capacitor voltage | Vc | 80 V |
| DC capacitor capacitance | C | 3.3 mF |
| Circuit constant | H | 42 ms |
| Carrier frequency | $f_C$ | 2 kHz |
| AC side interconnection reactor | $L_S$ | 2.75 mH (13.0%) |
| Coupled reactor | L | 2.25 mH (10.6%) |

The % values are based on 200 V, 6 kW, and 50 Hz.

Figure 6:
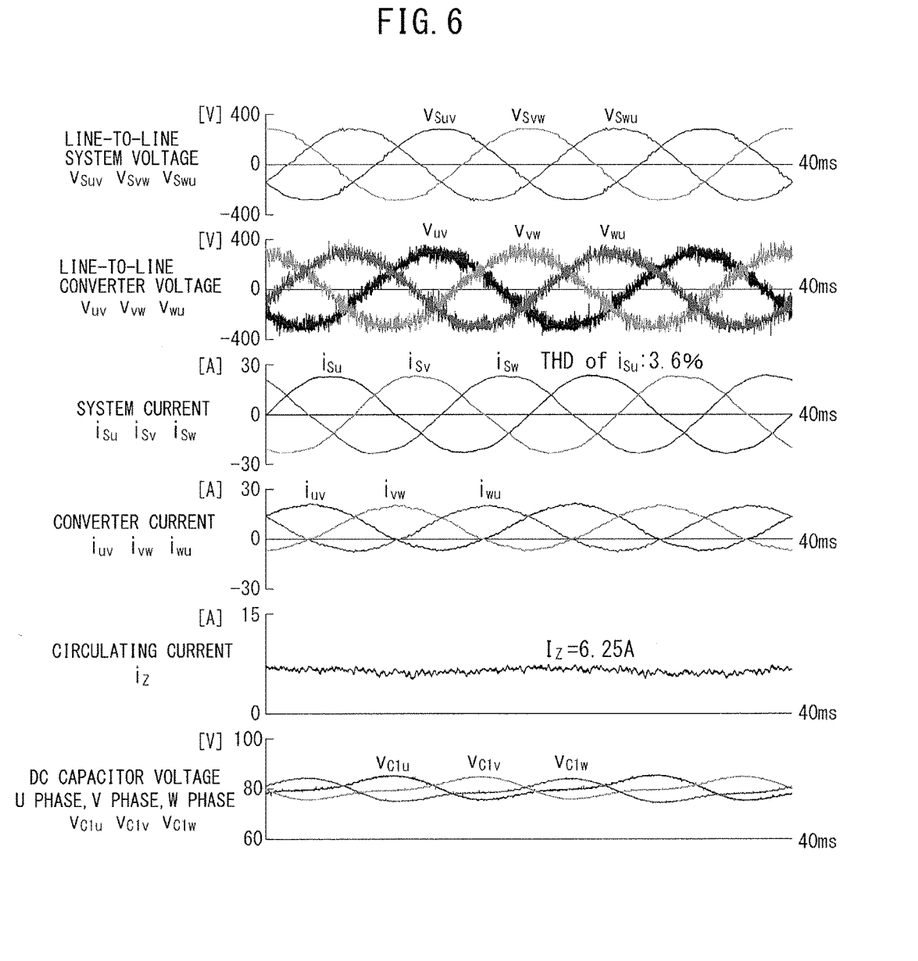
FIG. 6 is a diagram illustrating waveforms of an experiment result of an experiment carried out using the power converter according to the first example of the present invention.

FIG. 6 illustrates the result of the experiment using the power converter 101 according to the first example (6 kW, inverter operation, power factor–1). The line voltage $v_{uv}$ forms a multilevel waveform with seventeen levels, which shows that the influence from harmonic voltages is small. The power current $i_u$ is advanced by 150° with respect to the power voltage (system voltage) $v_{Suv}$, which realizes the inverter operation with a power factor of 1. The current THD value (total harmonic distortion) of the current $i_u$ is 3.6%, which shows that the influence from harmonic currents is small. The effective value of the circulating current is $I_z$=6.25 A (=6 kW/(3×320 V)). Looking at DC capacitor voltages $v_{Clu}$, $v_{Clv}$, and $v_{Clw}$, it can be seen that the DC components thereof are controlled to be 80 V.

Figure 7A:
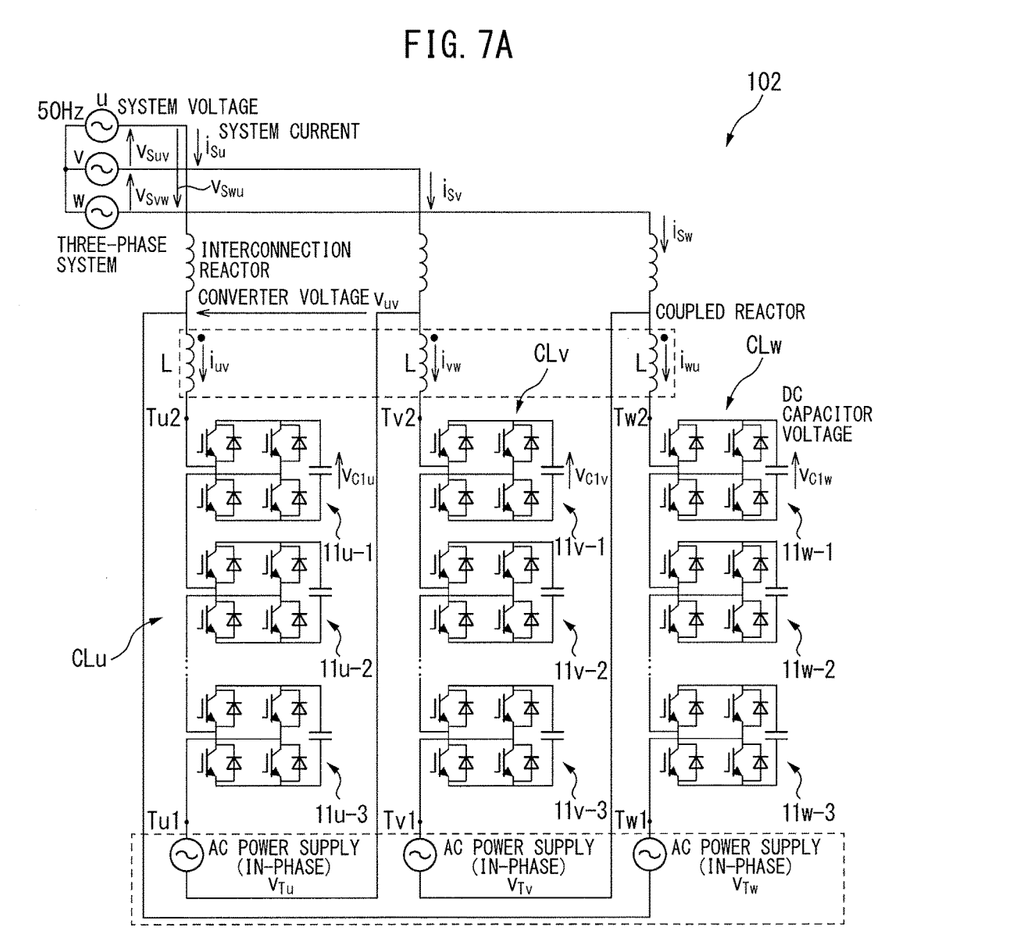
FIG. 7A is a circuit diagram of a power converter according to a second example of the present invention.

FIG. 7A is a circuit diagram illustrating the configuration of a power converter 102 according to a second example of the present invention. In the power converter 102 of the second example, bridge cells are used as unit cells in delta-connected three clusters CL. In other words, a plurality of bridge cells which are cascade-connected are provided in each of clusters CLu, CLv, and CLw of the respective phases.

In the power converter 102 according to the second example illustrated in FIG. 7A, three bridge cells 11u-j, 11v-j, and 11w-j (where j=1 to 3) that are cascade-connected as unit cells are provided in the clusters CLu, CLv, and CLw of the respective phases. The structure of each of the bridge cells 11u-j, 11v-j, and 11w-j (where j=1 to 3) is as described in FIG. 1B. In FIG. 7A, the system voltages of the respective phases of the system-side power voltage are defined as $v_{Suv}$, $v_{Svw}$, and $v_{Swu}$, and the system currents are defined as $i_{Su}$, $i_{Sv}$, and $i_{Sw}$. In addition, the converter currents that flow into the clusters CLu, CLv, and CLw of the respective phases of the power converter 102 are defined as $i_{uv}$, $i_{vw}$, and $i_{wu}$. Further, the voltages of the DC capacitors in the respective bridge cells 11u-j, 11v-j, and 11w-j are defined as $v_{Cju}$, $v_{Cjv}$, and $v_{Cjw}$ (where j=1 to 3).

The coupled reactors L include three windings and the winding numbers are equal respectively. The coupled reactors L include impedance only for the circulating current included in the converter currents $i_{uv}$, $i_{vw}$, and $i_{wu}$ that flow through the respective clusters CLu, CLv, and CLw, and the impedance for the system current component (50 Hz) is zero. The circulating current $i_z$ is defined as the following formula.

$$i_z = (i_{UV} + i_{VW} + i_{WU}) \div 3$$

In the power converter 102 according to the second example, one end of a single-phase AC power supply $V_{Tu}$ is connected in series with a terminal Tu1 on the opposite side of a terminal Tu2 at the coupled reactor L side of the cluster CLu of the U phase, and another end of the AC power supply $V_{Tu}$ is connected with the delta connection portion of the cluster CLv of the V phase that connects to the V phase of the three-phase AC. In addition, one end of a single-phase AC power supply $V_{Tv}$ is connected in series with a terminal Tv1 on the opposite side of a terminal Tv2 at the coupled reactor L side of the cluster CLv of the V phase, and another end of the AC power supply $V_{Tv}$ is connected with the delta connection portion of the cluster CLw of the W phase that connects to the W phase of the three-phase AC. Likewise, one end of a single-phase AC power supply $V_{Tw}$ is connected in series with a terminal Tw1 on the opposite side of a terminal Tw2 at the coupled reactor L side of the cluster CLw of the W phase, and another end of the AC power supply $V_{Tw}$ is connected with the delta connection portion of the cluster CLu of the U phase that connects to the U phase of the three-phase AC. Note that the AC power supplies $V_{Tu}$, $V_{Tv}$, and $V_{Tw}$ are all in phase with one another.

This configuration of the power converter 102 according to the second example enables stationary transferring of power between the single-phase AC power supplies and the three-phase system, thereby realizing single-phase AC to three-phase AC power conversion. Note that this configuration needs to connect single-phase AC power supplies to the respective clusters, and thus the number of needed AC power supplies is three.

Note that the power converter 102 according to the second example illustrated in FIG. 7A includes the AC power supplies $V_{Tu}$, $V_{Tv}$, and $V_{Tw}$ connected to outside the terminals Tu1, Tv1, and Tw1 of the clusters CLu, CLv, and CLw of the respective phases. However, the coupled reactors L and the AC power supplies $V_{Tu}$, $V_{Tv}$, and $V_{Tw}$ may be connected to the terminals Tu1 and Tu2 of the cluster CLu in reverse, in the same way as the DC power supplies in the first example. Further, the coupled reactors L and the AC power supplies $V_{Tu}$, $V_{Tv}$, and $V_{Tw}$ can be respectively inserted into arbitrary positions between the bridge cells in the clusters CLu, CLv, and CLw.

The coupled reactors L can be replaced with three uncoupled reactors. In the same way as the coupled reactors L, the uncoupled reactors can be inserted into arbitrary portions in the clusters. When the uncoupled reactors are used, which also serve as interconnection reactors, interconnection reactors illustrated in FIG. 7A can be eliminated.

Figure 8:
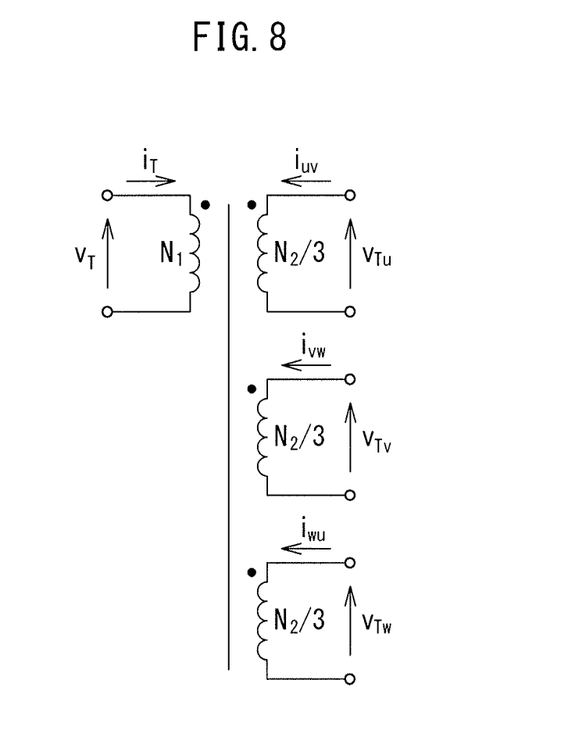
FIG. 8 is a circuit diagram illustrating an example of AC power supplies of the power converter according to the second example of the present invention.

FIG. 8 is a circuit diagram illustrating an example of the AC power supplies $V_{Tu}$, $V_{Tv}$, and $V_{Tw}$ of the power converter 102 according to the second example, illustrating insulated AC power supplies using a single-phase transformer. The primary winding is connected with a single-phase AC power supply or a single-phase AC load. The secondary winding is equally divided into three and they are connected to the respective clusters CLu, CLv, and CLw illustrated in FIG. 7A. The converter currents $i_{uv}$, $i_{vw}$, and $i_{wu}$ of the respective clusters CLu, CLv, and CLw flow into the secondary winding of the transformer. Since the system current components (50 Hz) included in the converter currents $i_{uv}$, $i_{vw}$ and $i_{wu}$ cancel each other out, no magnetomotive force is generated in the transformer. As a result, the operation frequency of the transformer is equivalent to the power supply frequency or the load frequency on the primary side of the transformer.

The power converter 102 according to the second example illustrated in FIG. 7A is also applicable to a motor load. In this case, a stator winding of the motor can be made into an open connection, and the stator winding for each phases is equally divided into three and they can be connected to the respective clusters in the same way as in FIG. 8. By using the three power converters 102 according to the second example illustrated in FIG. 7A, generation of a three-phase voltage and driving of a three-phase motor are enabled. As a result, transformer-less direct conversion of three-phase AC to three-phase AC can be realized.

In order to normally operate the power converter 102 according to the second example illustrated in FIG. 7A, it is needed that the voltages of the DC capacitors in the respective bridge cells are controlled to be constant. However, this control method may be the same as the control method for normally operating the power converter 101 according to the first example, and thus further description therefor is omitted.

Now, a result of a simulation carried out using the power converter 102 according to the second example of the present invention is described. Table 2 denotes circuit constants used in the simulation. In the simulation, the secondary-side winding of the transformer illustrated in FIG. 8 is connected to the AC power supply units of the respective phases in FIG. 7A, and a single-phase AC power supply of 3.3 kV and 200 Hz is directly connected to the primary winding. Note that the winding number ratio of the transformer is defined as $N_2/N_1 = 3$. 'PSCAD®/EMTDC™' software is used for the simulation.

TABLE 2

| Circuit Parameters Used in Simulation | | |
|---|---|---|
| Rated power | | 1 MW |
| Rated line voltage effective value | $V_S$ | 6.6 kV |
| Rated current effective value | $I_S$ | 87 A |
| Rated frequency | $f_S$ | 50 Hz |
| Number of bridge cells for each phase | N | 8 |
| DC capacitor voltage | Vc | 1.8 kV |
| DC capacitor capacitance | C | 1.5 mF |
| Circuit constant | H | 58 ms |
| Transformer primary side voltage effective value | $V_T$ | 3.3 kV |
| Transformer primary side current effective value | $I_T$ | 303 A |
| Operation frequency of transformer | $f_T$ | 200 Hz |
| Winding number ratio of transformer | $N_2/N_1$ | 3 |
| Carrier frequency | $f_C$ | 1 kHz |
| AC side interconnection reactor | $L_S$ | 7 mH (5.0%) |
| Coupled reactor | L | 14 mH (10.0%) |

The % values are based on 6.6 kV, 1 MW, and 50 Hz.

Figure 9:
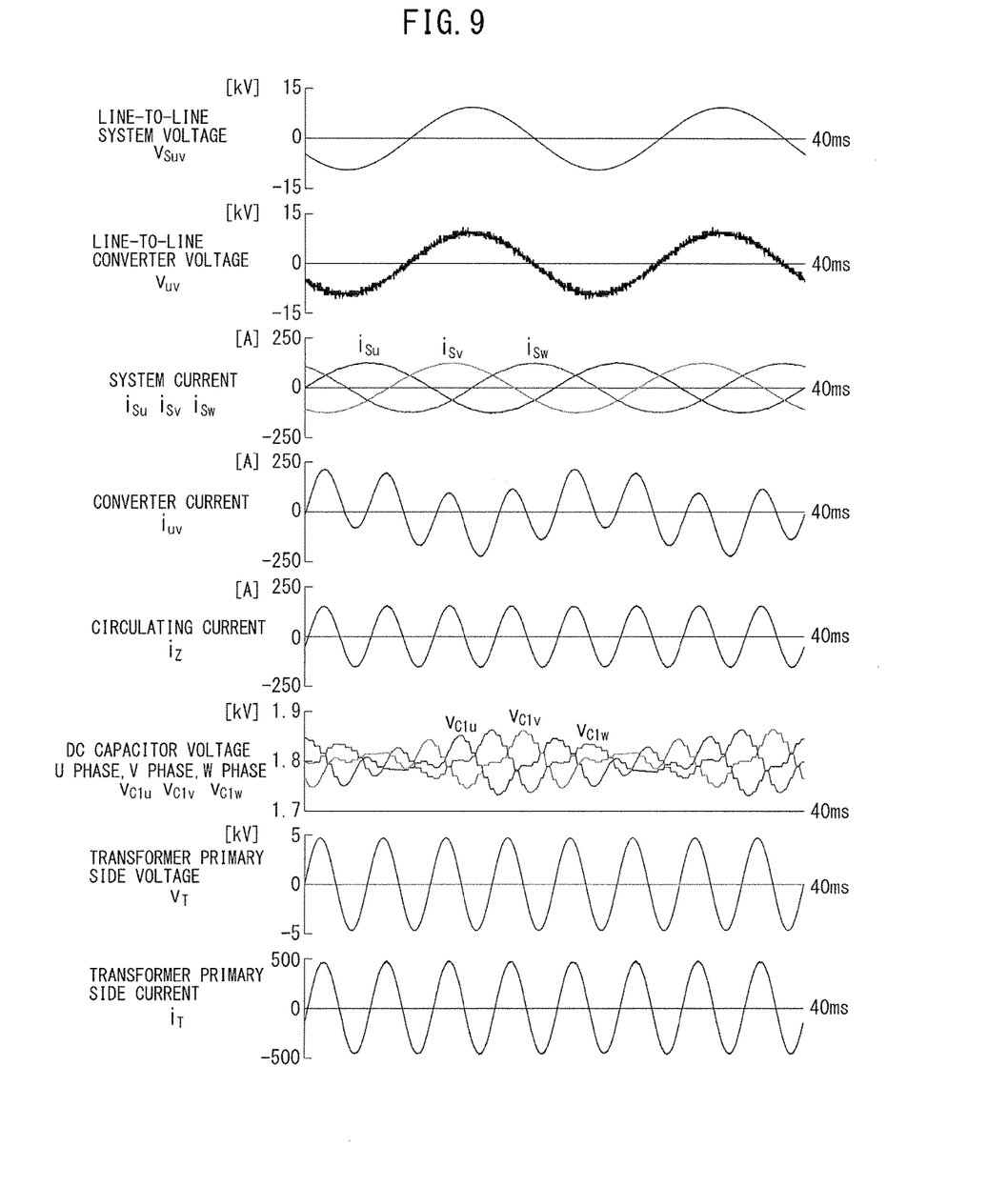
FIG. 9 is a diagram illustrating waveforms of a result of a simulation carried out using the power converter according to the second example of the present invention.

FIG. 9 illustrates the result of the simulation using the power converter 102 according to the second example (1 MW, inverter operation, power factor−1). The power current $i_u$ is advanced by 150° with respect to the power voltage $v_{Suv}$, which realizes the inverter operation with a power factor of 1. The circulating current $i_z$ is essentially constituted of a component of 200 Hz, which is the operation frequency of the transformer, with no system frequency component (50 Hz) included. Looking at DC capacitor voltages $v_{CIu}$, $v_{CIv}$, and $v_{CIw}$, it is seen that the DC components thereof can be controlled to be 1.8 kV. The AC components are constituted of the system frequency component of 50 Hz and the transformer operation frequency component of 200 Hz. The primary side voltage and the primary side current of the transformer are in phase with one another, and power is transferred from the transformer to the system. The primary side current of the transformer includes no system frequency (50 Hz).

The configuration of the power converter 102 according to the second example of the present invention has been described above with use of FIGS. 7A and 8. In the power converter 102 according to the second example, one end of each of the single-phase AC power supplies $V_{Tu}$, $V_{Tv}$, and $V_{Tw}$ are connected in series with the terminals Tu1, Tv1, and Tw1 on the opposite side of the terminals Tu2, Tv2, and Tw2 at the coupled reactor L side of the clusters of the respective phases, and other ends of the AC power supplies $V_{Tu}$, $V_{Tv}$, and $V_{Tw}$ are connected with the delta connection portions of the clusters that connect to other phases of the three-phase AC. On the other hand, a power converter 103 according to a third example, in which, anodes of DC power supplies Vdcu, Vdcv, and Vdcw are connected in series with terminals Tu1, Tv1, and Tw1 of the respective phases, and cathodes of the DC power supplies Vdcu, Vdcv, and Vdcw are connected with the delta connection portions of the clusters that connect to other phases of the three-phase AC, can be employed instead of the AC power supplies $V_{Tu}$, $V_{Tv}$, and $V_{Tw}$.

Figure 7B:
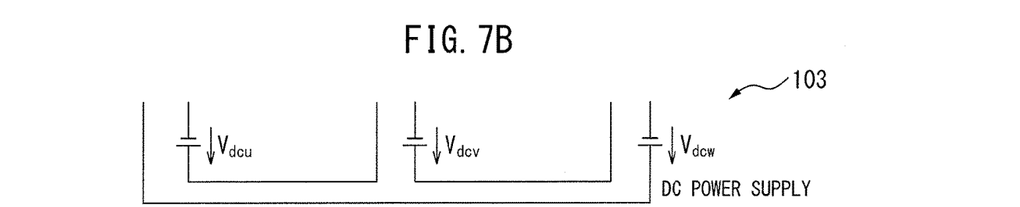
FIG. 7B is a partial circuit diagram illustrating a circuit of a power converter according to a third example of the present invention.

The power converter 103 according to the third example includes the same structure as the power converter 102 according to the second example, except for a part enclosed by the dashed line illustrated in FIG. 7A. Thus, as for the configuration of the power converter 103 according to the third example, a part corresponding to the part enclosed by the dashed line illustrated in FIG. 7A is alone illustrated in FIG. 7B. This configuration of the power converter 103 according to the third example enables stationary transferring of power between the DC power supplies and the three-phase system, thereby realizing DC power to three-phase AC power conversion. Note that this configuration needs to connect the DC power supplies Vdcu, Vdcv, and Vdcw to the respective clusters, and thus the number of needed DC power supplies is three.

The control of the power converter 103 according to the third example is the same as the control of the power converter according to the second example, and thus further description therefor is omitted.

As has been described above, according to the present invention, a DC to three-phase AC power converter can be realized by incorporating DC power supplies into respective sides of the delta connection in the single delta-connected bridge cell MMCC. In addition, a single-phase AC to three-phase AC power converter can be realized by incorporating in-phase AC power supplies into respective sides of the delta connection in the single delta-connected bridge cell MMCC, and a three-phase AC to three-phase AC power converter can be realized by using three of the single-phase AC to three-phase AC power converters. Further, DC to three-phase AC power conversion can be realized by replacing the bridge cells of the existing single delta-connected bridge cell MMCC with the chopper cells and incorporating DC power supplies into respective sides of the delta connection. Then, these configurations can expand the application fields of the MMCCs.

REFERENCE SIGNS LIST 11u-j, 11v-j, 11w-j Unit cell (chopper cell, bridge cell)
100, 101, 102, 103 Power converter
BC Bridge cell
CC Chopper cell
C DC capacitor
CL, CLu, CLv, CLw Cluster
L Coupling reactor
MMCC Modular multilevel cascade converter
SDBC Single delta-connected bridge cell MMCC
SW Semiconductor switch
Vdcu, Vduv, Vdcw DC power supply
$V_{Tu}$, $V_{Tv}$, $V_{Tw}$ AC power supply

The invention claimed is:

1. A power converter comprising:
   three clusters in which unit cells are cascade-connected; and
   power supplies of the same kind, a first end of each power supply connected to a first end of an associated cluster of the three clusters, wherein
   a delta connection is formed by connecting a second end of each cluster to a second end of power supply associated with another cluster, and
   three connection portions of the delta connection are configured to be connected to respective phases of a three-phase alternating current (AC) system for power conversion to be performed between the power supplies and the three-phase AC system.

2. The power converter according to claim 1, wherein the power supplies are direct current (DC) power supplies, and
   the unit cells are chopper cells that include two semiconductor switches that are connected in series, a DC capacitor that is connected in parallel with the two semiconductor switches, and input and output terminals for a current that is discharged from the DC capacitor or charged in the DC capacitor according to a switching operation of the semiconductor switches.

3. The power converter according to claim 1, wherein the power supplies are direct current (DC) power supplies, and
   the unit cells are bridge cells that include a set of parallelly connected two pairs of two semiconductor switches that are connected in series, a DC capacitor that is connected in parallel with the set of the two pairs of semiconductor switches, a series connection point for each pair of the two semiconductor switches, and input and output terminals for a current that is discharged from the DC capacitor or charged in the DC capacitor.

4. The power converter according to claim 1, wherein the power supplies are in-phase AC power supplies, and
   the unit cells are bridge cells that include a set of parallelly connected two pairs of two semiconductor switches that are connected in series, a direct current (DC) capacitor that is connected in parallel with the set of the two pairs of semiconductor switches, a series connection point for each pair of the two semiconductor switches, and input and output terminals for a current that is discharged from the DC capacitor or charged in the DC capacitor.

5. The power converter according to claim 4, wherein generation of a three-phase voltage and driving of a three-phase motor are enabled by using the three power converters in which the unit cells are bridge cells.

6. The power converter according to claim 4, wherein the AC power supplies are formed by insulated AC power supplies using a single-phase transformer.

7. The power converter according to claim 1, wherein each of the semiconductor switches includes:
   a semiconductor switching element that allows a current to flow in a single direction during ON; and
   a feedback diode that is connected in reverse parallel with the semiconductor switching element.

8. A power converter comprising:
   three clusters, each cluster including a plurality of unit cells that are cascade-connected; and
   direct current (DC) power supplies, each power supply respectively inserted between arbitrary connection points of the plurality of unit cells of an associated cluster of the three clusters, wherein
   a delta connection is formed by connecting an anode-side terminal of each cluster with an inserted DC power supply to a cathode-side terminal of another cluster with an inserted DC power supply, and
   three connection portions of the delta connection are configured to be connected to respective phases of a three-phase alternating current (AC) system for power conversion to be performed between the DC power supplies and the three-phase AC system.

9. The power converter according to claim 8, wherein the unit cells are chopper cells that include two semiconductor switches that are connected in series, a DC capacitor that is connected in parallel with the two semiconductor switches, and input and output terminals for a current that is discharged from the DC capacitor or charged in the DC capacitor according to a switching operation of the semiconductor switches.

10. The power converter according to claim 8, wherein the unit cells are bridge cells that include a set of parallelly connected two pairs of two semiconductor switches that are connected in series, a DC capacitor that is connected in parallel with the set of the two pairs of semiconductor switches, a series connection point for each pair of the two semiconductor switches, and input and output terminals for a current that is discharged from the DC capacitor or charged in the DC capacitor.

11. A power converter comprising:
    three clusters in which unit cells are cascade-connected; and
    in-phase alternating (AC) power supplies, each power supply respectively inserted between arbitrary connection points of the plurality of unit cells of an associated cluster of the three clusters, wherein
    a delta connection is formed by connecting a first end of each cluster with an inserted AC power supply to a second end of another cluster with an inserted AC power supply, and
    three connection portions of the delta connection are configured to be connected to respective phases of a three-phase AC system for power conversion to be performed between the in-phase AC power supplies and the three-phase AC.

12. The power converter according to claim 11, wherein the unit cells are bridge cells that include a set of parallelly connected two pairs of two semiconductor switches that are connected in series, a direct current (DC) capacitor that is connected in parallel with the set of the two pairs of semiconductor switches, a series connection point for each pair of the two semiconductor switches, and input and output terminals for a current that is discharged from the DC capacitor or charged in the DC capacitor.

13. The power converter according to claim 11, wherein generation of a three-phase voltage and driving of a three-phase motor are enabled by using the three power converters in which the unit cells are bridge cells.

14. The power converter according to claim 11, wherein the AC power supplies are formed by insulated AC power supplies using a single-phase transformer.

* * * * *